(12) United States Patent  
Ito

(10) Patent No.: US 7,103,383 B2
(45) Date of Patent: Sep. 5, 2006

(54) APPARATUS, SYSTEM, METHOD AND COMPUTER PROGRAM PRODUCT FOR DIGITAL BEAMFORMING IN THE INTERMEDIATE FREQUENCY DOMAIN

(75) Inventor: Teisuke Ito, Fairfax, VA (US)

(73) Assignee: Wirless Highways, Inc., Vienna, VA (US)

( * ) Notice: Subject to any disclaimer, the term of this patent is extended or adjusted under 35 U.S.C. 154(b) by 499 days.

(21) Appl. No.: 10/331,762

(22) Filed: Dec. 31, 2002

(65) Prior Publication Data

US 2004/0127168 A1 Jul. 1, 2004

(51) Int. Cl.
*H04M 1/00* (2006.01)
*H04Q 3/22* (2006.01)
*H04H 7/30* (2006.01)

(52) U.S. Cl. .............................. 455/562.1; 455/277.1; 455/561; 342/372; 375/233

(58) Field of Classification Search ............. 455/562.1, 455/101, 561, 273, 276.1, 560
See application file for complete search history.

(56) References Cited

U.S. PATENT DOCUMENTS

| | | | |
|---|---|---|---|
| 4,431,995 A | | 2/1984 | Barton et al. |
| 4,965,602 A | * | 10/1990 | Kahrilas et al. ............ 342/372 |
| 5,077,562 A | | 12/1991 | Chang et al. |
| 5,461,389 A | | 10/1995 | Dean |
| 5,579,341 A | | 11/1996 | Smith et al. |
| 5,585,803 A | | 12/1996 | Miura et al. |
| 5,909,460 A | * | 6/1999 | Dent .......................... 375/130 |
| 5,917,447 A | | 6/1999 | Wang et al. |
| 6,052,085 A | * | 4/2000 | Hanson et al. ............. 342/373 |
| 6,054,948 A | | 4/2000 | Dean |
| 6,115,419 A | | 9/2000 | Meehan |
| 6,404,821 B1 | | 6/2002 | Dent |
| 6,441,783 B1 | | 8/2002 | Dean |
| 6,570,537 B1 | | 5/2003 | Frey, Jr. |
| 6,600,446 B1 | | 7/2003 | Moch |
| 6,693,590 B1 | | 2/2004 | Toplicar et al. |
| 6,768,913 B1 | * | 7/2004 | Molnar et al. ........... 455/562.1 |
| 6,778,137 B1 | | 8/2004 | Krikorian et al. |
| 6,788,250 B1 | | 9/2004 | Howell |
| 6,795,018 B1 | | 9/2004 | Guo |
| 6,816,116 B1 | | 11/2004 | Chen |
| 6,823,174 B1 | * | 11/2004 | Masenten et al. .......... 455/63.4 |
| 2002/0024975 A1 | | 2/2002 | Hendler |
| 2002/0154687 A1 | * | 10/2002 | Bierly et al. ................ 375/222 |
| 2004/0246176 A1 | | 12/2004 | Mohamadi |

* cited by examiner

*Primary Examiner*—Tilahun Gesesse
(74) *Attorney, Agent, or Firm*—Edell, Shapiro & Finnan, LLC

(57) ABSTRACT

An apparatus, system, method and computer program product for digital beamforming in the IF domain. The beamforming technique of the present invention can be implemented in general point-to-multipoint wireless networks to significantly increase bandwidth in both the downlink and uplink directions. This beamforming technique allows for a modular design of a smart antenna system which typically includes an antenna array, a multiple number of transceivers, IF beamformers, and a set of modems.

60 Claims, 6 Drawing Sheets

APPARATUS, SYSTEM, METHOD AND COMPUTER PROGRAM PRODUCT FOR DIGITAL BEAMFORMING IN THE INTERMEDIATE FREQUENCY DOMAIN

FIELD OF THE INVENTION

The apparatus, system, method and computer program product of the present invention is directed to digital beamforming techniques implemented in point-to-multipoint wireless networks.

BACKGROUND OF THE INVENTION

In the past, wireless systems employed fixed antenna systems with antenna patterns that were carefully engineered to achieve desired coverage characteristics. In these systems, as in most wireless systems, the link between a base station and a portable unit is for communicating data in the uplink and downlink directions. Uplink is when the portable unit is the transmitter and the base station is the receiver, and downlink is when the base station is the transmitter and the portable unit is the receiver. Although these fixed antenna systems are effective for less sophisticated wireless communications, they are not effective for today's wireless systems. Today's wireless systems must be capable of handling dynamic changes in data traffic requirements.

Smart antennas offer a broad range of ways to improve the performance of today's wireless system. Some of these improvements relate to enhanced coverage, reduced infrastructure costs and increased system capacity. System coverage is improved by increasing the gain of the base station antenna without increasing the output power of base station or subscriber units. Smart antenna technology can also be used to improve various types of wireless systems such as Frequency Division Multiple Access (FDMA), Time Division Multiple Access (TDMA) and Code Division Multiple Access (CDMA). FDMA and TDMA systems are improved by having increased carrier-to-interference ratios, which allows for more frequent reuse of frequency channels. CDMA systems are improved because subscribers transmit less power for each link, which reduces multiple access interference and increases the number of simultaneous subscribers that can be supported in a single cell.

Smart antennas use a fixed set of antenna elements in an array. The signals from these antenna elements are combined to form a movable beam pattern that can be steered, using either digital signal processing, or radio frequency (RF) hardware, to desired direction that tracks mobile units as they move. This allows smart antenna systems to focus RF signals on a particular subscriber, while minimizing the impact of noise, interference, and other effects that can degrade signal quality.

Smart antennas can also be used to spatially separate signals, allowing different subscribers to share the same spectral resources, provided that they are spatially separable at the base station. This is known as Space Division Multiple Access SDMA, which allows multiple users to operate in the same cell, and on the same frequency or time slot. Since this approach allows more users to be supported within a limited spectrum allocation, compared with conventional antennas, SDMA can lead to improved capacity.

In general, smart antenna systems use beamforming techniques that combine a number of data signals from a number of low gain antenna elements. Beamforming can be realized in various stages of a wireless system, such as baseband, IF, or RF. A baseband beamforming is normally performed digitally, while the RF beamforming is done in analog mode. IF beamforming can be carried out in either digital or analog mode. Between the two, the digital beamforming is more cost-effective, accurate and reliable. However, using IF beamforming it is more challenging to achieve sufficiently high processing speed and resolution in uplink and downlink directions of a wireless system.

Thus, it is desirable to provide an apparatus, system, method and computer program product for improved IF digitial beamforming in a wireless network. The apparatus, system, method and computer program product of the present invention disclosed herein address this need.

SUMMARY OF THE INVENTION

A apparatus, system, method and computer program product of the present invention provides a unique beamforming technique that can be implemented in a general point-to-multipoint wireless network to significantly increase its bandwidth. This beamforming technique can be implemented in an existing point-to-multipoint wireless network using off-the-shelf ASIC chips for critical processing stages. It is contemplated by the invention that the system includes an antenna array, a multiple number of transceivers, an intermediate frequency (IF) beamformer unit, and a set of modems. To process data signals in accordance with the present invention, a normal IF input signal is first separated into IF signal pairs. An in-phase and quadrature signal is then generated for each IF input signal. At least part of the IF input signal is shifted in amplitude and phase in a specific way. The in-phase and quadrature signals are then multipled by a weight coefficient vector and then combined to produce a weighted IF output signal. The IF signals are either upconverted or downeonverted at a point in the data processing depending on the direction of the data flow. In the downlink direction, the IF output signal is upconverted to a desired transmit frequency. In the uplink direction, the input signal is downconverted to a desired IF frequency. The combined signal transmitted from the antenna elements of the antenna array can be sent in a desired direction with a controlled azimuthal coverage. A key component of the present invention is the unique approach of amplitude and phase shifting IF signals and the way multiple IF signals are combined. As a byproduct of this approach, it becomes a trivial configuration modification to invert an entire IF spectrum.

The digital beamforming technique of the present invention can be applied to both the uplink and downlink paths of a wireless network using similar hardware. Thus, the hardware implementation of the present invention is simple, inexpensive and modular.

It is another object of the present invention that the core hardware components perform three basic steps of digital signal processing: pre-beamforming, beamforming, and post-beamforming. In pre-beamforming, in-phase and quadrature signals are generated from IF input signals. Next, the beamforming unit multiplies weight coefficient vectors to the IF signals. This is followed by a summation of IF signals over a number of IF sources. In the post-beamforming stage, the digital signal is converted back to an analog signal. The output IF data signal has the same carrier frequency as the incoming data signal to enable a simple plug-in of an IF module.

It is another object of the present invention that the beamformer unit includes a multiple number of processing modules, which can be configured according to the available transmitter/receiver analog channels and baseband modem units. The processor module, equipped with a general-purpose programmable processor, performs all the control and monitoring to achieve flexibility in system operations, including automated calibration capability to compensate for differences in phase and amplitude among the transmitter/receiver channels. Additionally, under the control of the processor, the software-defined multiplier coefficients can be loaded quickly and simultaneously over the multiple channels to enable real-time beamforming that adjusts for dynamic changes in network data traffic.

It is another object of the present invention that IF digital beamforming is implemented in software within the beamformer unit.

It is another object of the present invention that the IF digital beamforming is used to correct spectral inversion.

It is another object of the present invention that IF beamforming include the capability of receiving a wide range of IF frequencies as well as any radio frequencies (RF).

It is another object of the invention that beamforming in the IF domain provides a modular design for a smart antenna system.

It is another object of the present invention that beamforming in the IF domain provides advantages over existing baseband or RF beamforming systems.

BRIEF DESCRIPTION OF THE DRAWINGS

The accompanying figures best illustrate the details of the apparatus, system, method and computer program product of the present invention. Like reference numbers and designations in these figures refer to like elements.

DETAILED DESCRIPTION OF THE INVENTION

Figure 1:
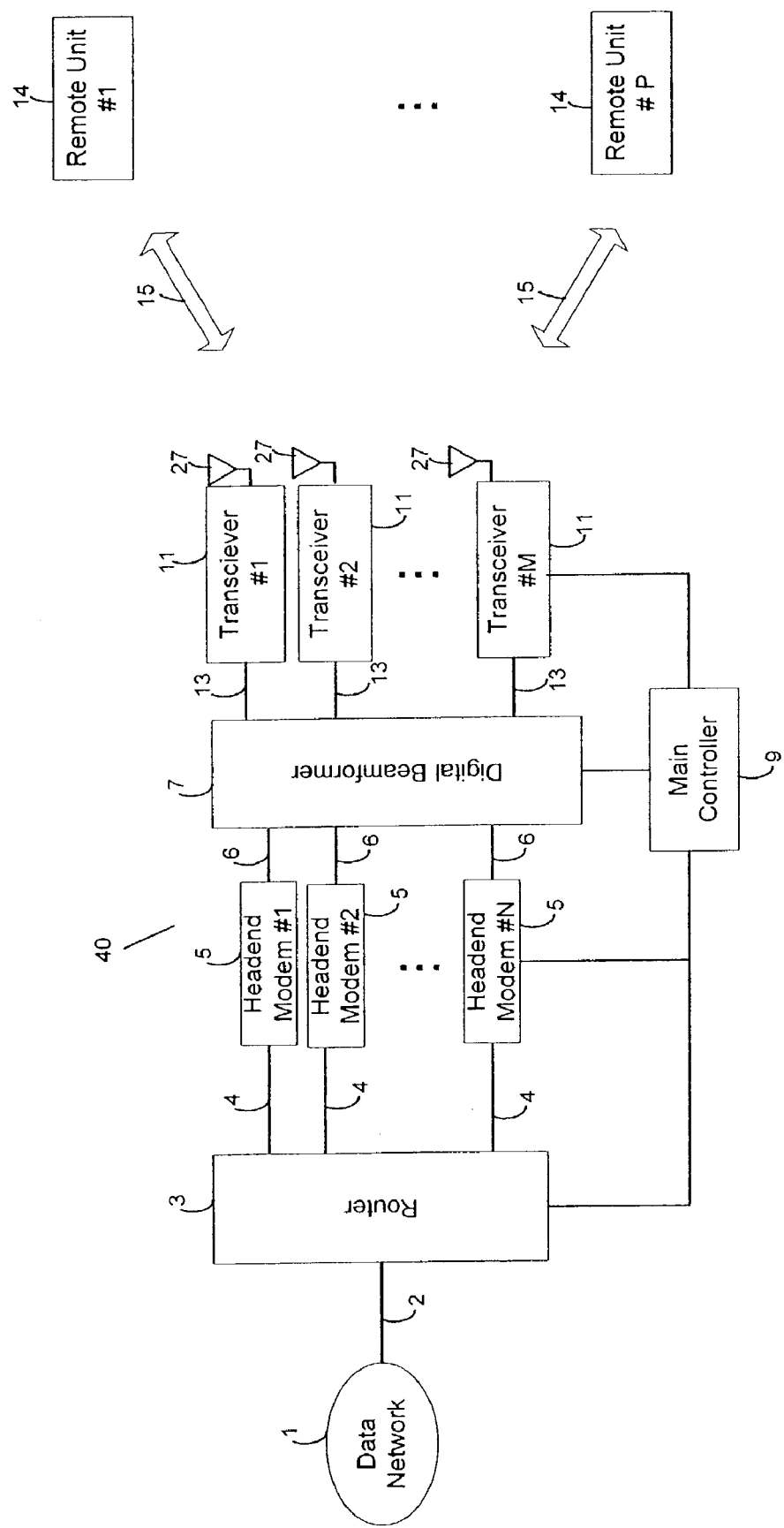
FIG. 1 is a system diagram for implementing digital beamforming in accordance with an embodiment of the present invention.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof FIG. 1 is a system diagram illustrating IF digital beamforming in a wireless network 40 in accordance with an embodiment of the invention. As seen in FIG. 1, from left to right, a data connection 2 is made between the router 3 and a data network 1 for the communication of IF data signals to the digital beamformer unit 7. The data connection 2 is a high data rate connection such as fiber optic connection, OC3 connection or other data connection for communicating data at a high rate that is well known in the art. The data connection 2 to the router 3 is considered to be at the headend or beginning of the network 40. The IF data signals are received by the router 3 and sent to a number of headend modems 5 via respective connections 4 between the router 3 and the modems 5. It is contemplated by the invention that each modem 5 has specific address information for directing data signals to particular remote units 14 in communication with the wireless network 40. The output 6 of each of the modems 5 is connected to an input of the digital beamformer 7 for performing digital signal processing of data signals in the IF domain. In processing the data, the beamformer unit 7 performs fast data signal processing of each data signal received at a respective input. A key aspect of the data processing by the beamformer unit 7 is the unique phase and amplitude control of the IF signals in the IF domain together with the combining of the weighted IF signals. The unique digital signal processing performed by the beamformer unit 7 will be discussed in more detail in the description of FIGS. 3–5.

Once the digital signal processing by the beamformer unit 7 is complete, the output IF signals are sent to respective transcievers 11 via connections 13 between the digital beamformer 7 and the tranceivers 11. It is contemplated by the invention that each tranceiver 11 includes a converter (not shown) for converting the data signals for processing or for transmission. For example, in the downlink direction the IF output signal is converted from intermediate frequency to radio frequency for transmission to individual remote units 14, customer premise equipment (CPEs) or the like. In the uplink direction, the IF input signals are converted into the IF domain for processing by the digital beamformer unit 7. Each of the transceivers 11 also includes an antenna element 27 for the reception and transmission of data between the beamformer unit 7 and the remote units 14 via respective data channels 15. It contemplated by the invention that the main controller 9 controls the antenna elements 27. The control of the antenna elements relates to, for example, spacing between the antenna elements 27 of an antenna array. The main controller 9 also performs monitoring, coordination and configuration between the router 2, modems 5 and beamformer unit 7 as well as power control, feedback status and general network 40 control. Additionally, the beamformer unit 7 also has at least one controller for monitoring and determining the status of the beamformer unit 7.

After the IF output signals are converted they are transmitted to individual remote units 14 or CPEs. It is contemplated by the invention that the remote units 14 include a cellular telephone, a satellite telephone, a personal digital assistant, bluetooth device or other similar wireless device. Additionally, the CPEs can be located atop a building, tower or similar structure for transferring the data to an end user. However, the remote units 14 and CPEs are in no way limited to the example given above and can vary in both type and location depending on the application of the of the wireless system.

Figure 2:
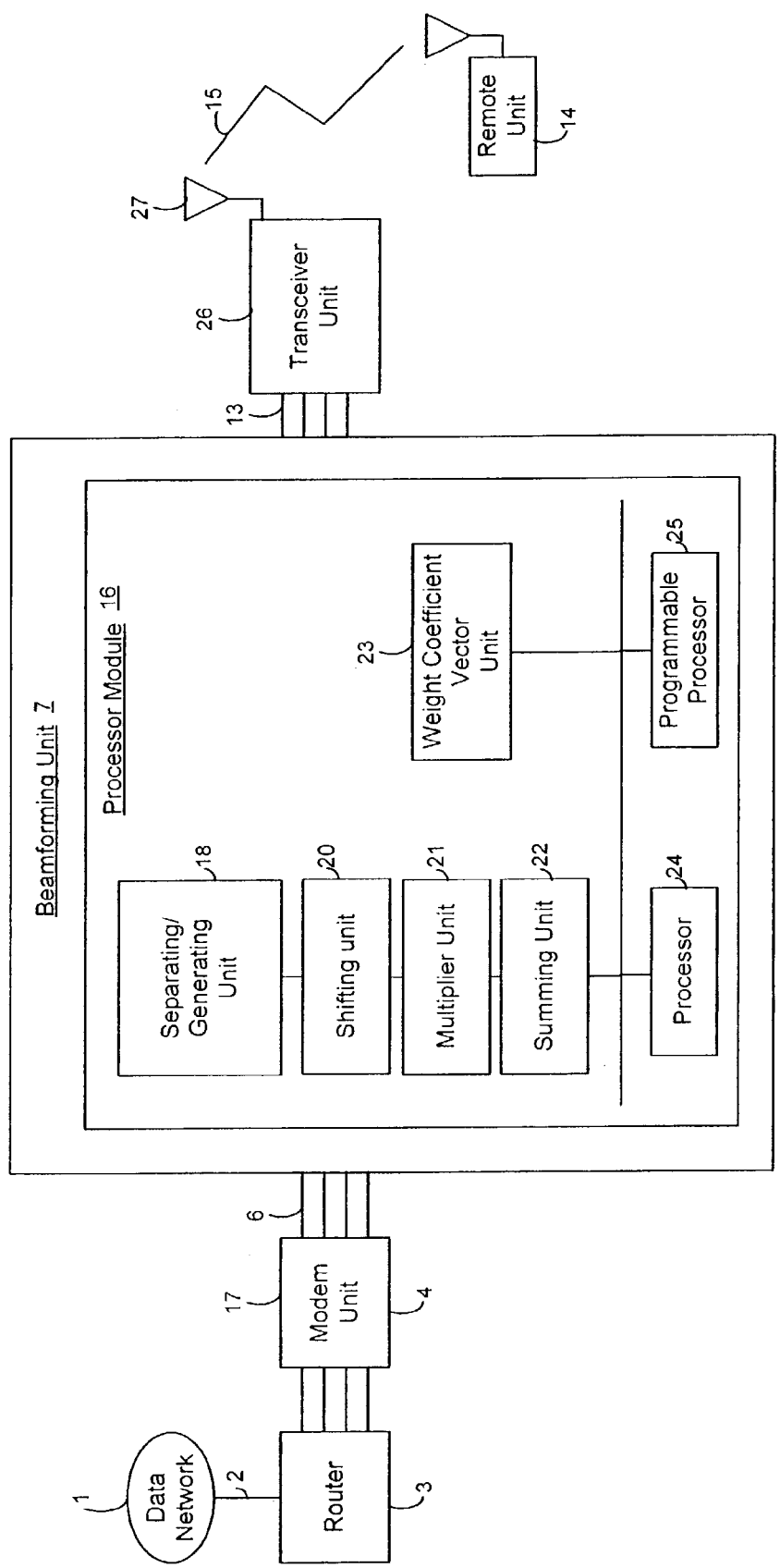
FIG. 2 is a more detailed illustration of the digital beamformer in accordance with an embodiment of the present invention.

FIG. 2 provides a more detailed diagram of the IF digital beamformer unit 7 in accordance with an embodiment of the invention. It is contemplated by the invention that IF beamforming allows for a modular design of, for example, a smart antenna system, and will include, in relevant part, an antenna array 27, a transceiver unit comprising multiple transceivers 11, beamformer unit 7 and a set of modems 5. As seen in FIG. 2, the modem unit 17, which includes a number of modems 5, provides input data signals to the beamforming unit 7 for digital processing. It is contemplated by the invention that the beamformer unit 7 includes a multiple number of processing modules 16, which can be configured according to the data channels 15 and modems 5 needed to process and communicate data to and from remote units 14. FIG. 2, for simplicity, illustrates only a single channel processing unit 16.

The processing module 16 performs the digital signal processing of the input data signals as well as the general control, monitoring and calibration of digital beamforming operation via the main control processor 24. For example, the main processor 24 controls the execution of the separating/generating unit 18, phase shifting unit 20, multiplier unit 21 and summing unit 22, when performing the digital signal processing of the IF input signals. Additionally, the programmable processor 25 allows for real-time loading and modification of weight coefficient vectors, in the weight coefficient vector unit 23, which is another a key component for performing the digital signal processing in accordance with the present invention. It is contemplated by the invention that the units 18, 20, 21, 22 and 23 in the beamformer unit 7 are implemented in software. The operation of the different units 18, 20, 21, 22 and 23 of the beamformer 7 will be explained in more detail in the explanation of FIGS. 3–5. For now it is enough to say that the beamformer unit 7 performs three basic steps of digital signal processing: pre-beamforming, beamforming and post-beamforming. In pre-beamforming, pairs of in-phase and quadrature signals are generated from incoming IF signals from input sources. The beamforming unit 7 then multiplies weight coefficient vectors 23 with the IF signals. Next, the beamforming unit 7 performs a summation over the number of input sources, which produces IF output signals. In the post-beamforming, the digital output signal is converted back to an analog signal. It is contemplated by the invention that the output IF signal has the same carrier frequency as the incoming IF data signal to allow for simplified compatibility with existing IF systems.

Figure 3:
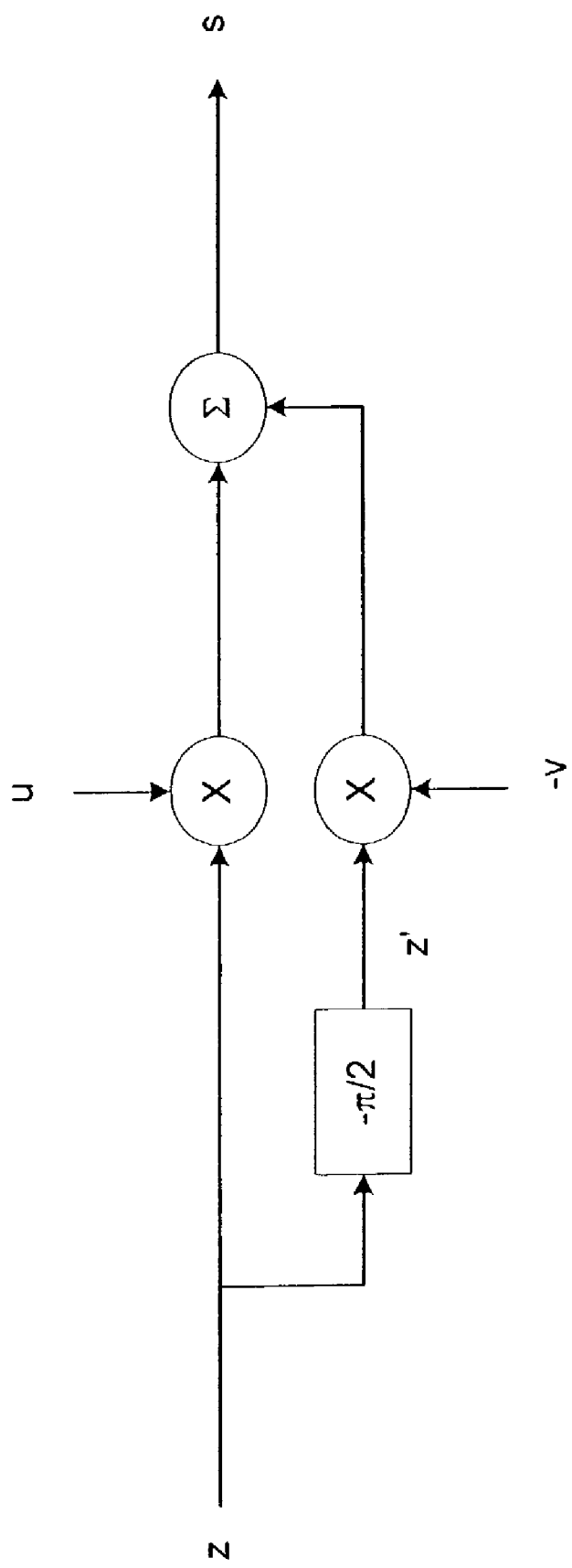
FIG. 3 is a schematic representation of digital beamforming in a single transmitter/receiver channel in accordance with an embodiment of the present invention.

FIG. 3 is an illustration of digital beamforming on a single channel in the downlink direction in accordance with an embodiment of the present invention. It is contemplated in FIG. 3 that the digital beamforming is performed within the digital beamformer unit 7. In FIG. 3, z is the real IF input signal received at an input of the beamformer unit 7 from the output of a modem 5. The real IF signal z of a general transmitter, whether it is analog or digital, is expressed in the following standard format:

$$z(t)=x(t)\cos(\omega_c t)-y(t)\sin(\omega_c t)=Re[(x+jy)\exp(j\omega_c t)]$$

where x(t) and y(t) are in-phase I- and quadrature Q-components of the original signal in the baseband, and $\omega_c$ is the IF center frequency. The real IF signal z is initially split by the separating and generating unit 18 into a real component and an imaginary component, or in-phase and quadrature signals. The imaginary component is then phase shifted by the phase shifting unit 20 by 90 degrees to arrive at the imaginary component of the data signal z'. It is well known that the 90 degrees phase-shifted component of the data signal can be expressed as follows:

$$z'(t)=x(t)\sin(\omega_c t)+y(t)\cos(\omega_c t)=Im[(x+jy)\exp(j\omega_c t)]$$

As show in FIG. 3, both the phase shifted imaginary component of the IF signal z' and the real component of the IF signal z are multiplied by a weight coefficient u, –v by the multiplier unit 21. The weight coefficient u, –v is used to obtain two separate weighted IF signal in the IF domain. The weight coefficient is represented by the following expression:

$$w=(u+jv)$$

After multiplying each component of the IF signal z, z' with the weight coefficient, the two weighted IF signals are combined by the summing unit 22 to arrive at a weighted real IF signal s in the IF domain. The operation for arriving at s or s(t) is represented by the following expression:

$$\begin{aligned}s(t) &= Re[(x+jy)(u+jv)\exp(j\omega_c t)]\\&= (xu-yv)\cos(\omega_c t)-(xv+yu)\sin(\omega_c t)\\&= [(x\cos(\omega_c t)-y\sin(\omega_c t)]u-[(x\sin(\omega_c t)-y\cos(\omega_c t)]v\\&= z(t)u-z'(t)v\\&= zu+z'(-v)\end{aligned}$$

where x(t) and y(t) are in-phase I- and quadrature Q-components of the original signal in the baseband, and $\omega_c$ is the IF carrier frequency. The real IF signal z is initially split by the separating and generating unit 18 into a real component and an imaginary component, or in-phase and quadrature signals. The imaginary component is then phase shifted by the phase shifting unit 20 by 90 degrees to arrive at the imaginary component of the data signal z'. It is well known that the 90 degrees phase-shifted component of the data signal can be expressed as follows:

$$z'(t)=x(t)\sin(\omega_c t)+y(t)\cos(\omega_c t)=Im[(x+jy)\exp(j\omega_c t)]$$

Figure 4:
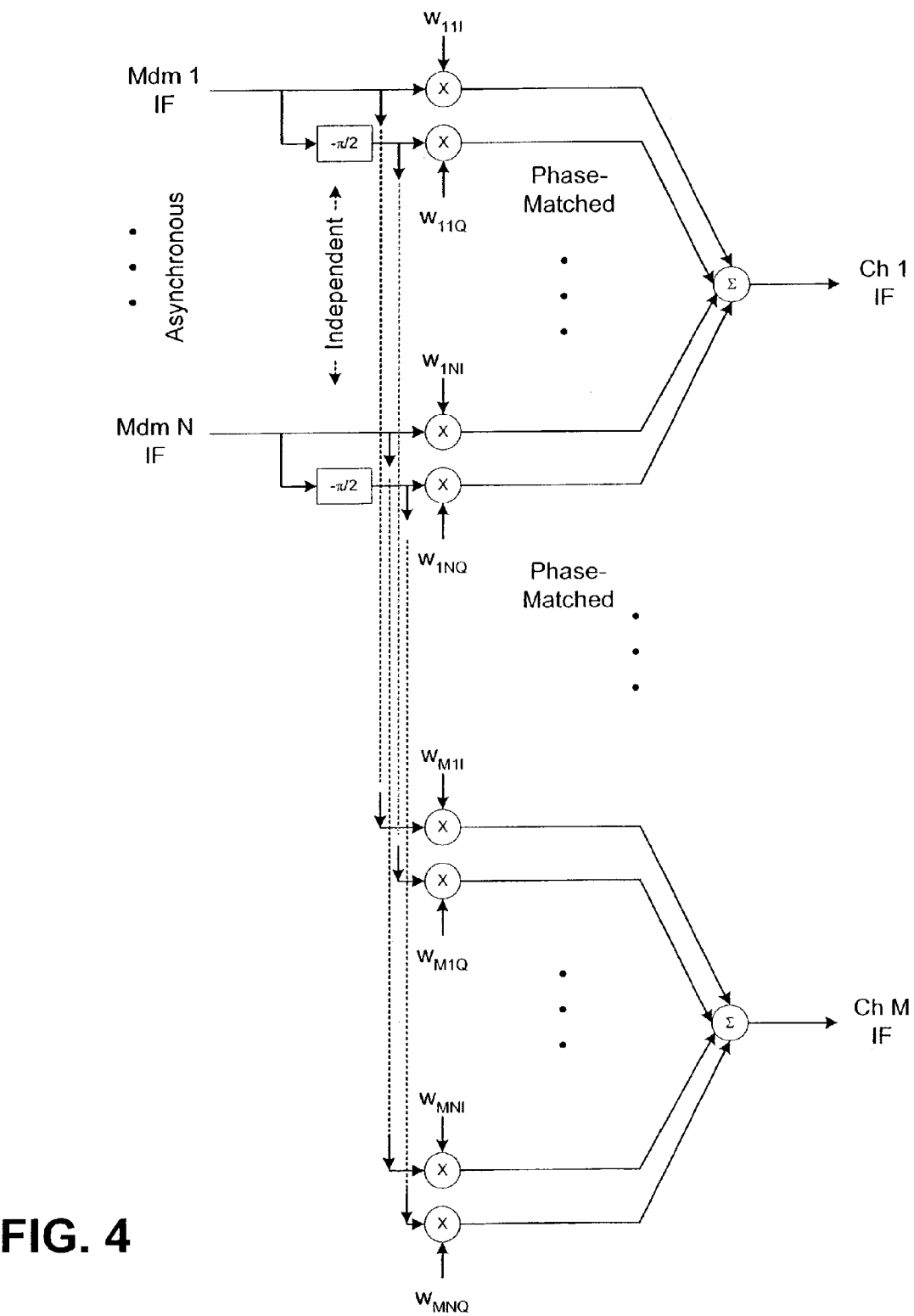
FIG. 4 is a schematic representation of beamforming in the downlink direction of a wireless network in accordance with an embodiment of the present invention.

FIG. 4 illustrates a higher form of data processing performed by the beamformer unit for the "downlink" direction of the wireless network of FIG. 1. As seen in FIG. 4, data signals are being processed for several different channels Ch 1–Ch M in the downlink direction of the wireless network for transmission to several different remote units 14 via the transceivers 11 and respective antenna elements 27, simultaneously. It is contemplated by the invention that, in the downlink direction, the data signals are received by the beamformer unit 7 from the modems Mdm 1–Mdm N, and the data signals are asynchronous. Similar to FIG. 2, a high data rate connection 2 is used for receiving data at the router 3 of the wireless network 40. From the router 3, the data signals are connected to modem Mdm 1–Mdm N in the IF frequency domain. From the modems Mdm 1–Mdm N, the IF signals are sent to respective inputs of the beamformer unit 7 for digital signal processing.

Similar to the digital signal processing performed in FIG. 2, the processing of a data signals in FIG. 4 begins with the separating of each IF signal received from the output of the modems Mdm 1–Mdm N into an in-phase and quadrature component or a real and imaginary component of the IF signal by a separating/generating unit 18. In other words, signal pairs are generated from the incoming IF signal for each modem Mdm 1–Mdm N received by the beamformer unit 7. As mentioned previously, the data signals received by the beamformer unit 7 from the modems Mdm 1–Mdm N are independent from each other or asynchronous. Next, The beamformer unit 7 then shifts the imaginary component of each IF signal by 90 degrees. The beamformer unit 7 multiplies weight coefficient vectors $W_{11I}$, $W_{1NQ}-W_{1NI}$, $W_{1NQ}$; $W_{M1I}$, $W_{M1Q}-W_{MNI}$, $W_{MNQ}$ with the respective real and the phase-shifted component of the IF signal to produce weighted IF signals for each source modem 5. It is contemplated by the invention that each of the IF signals from the modem sources Mdm 1–Mdm are multiplied by a distinct weight coefficient $W_{11I}$, $W_{1NQ}-W_{1NI}$, $W_{1NQ}$; $W_{M1I}$, $W_{M1Q}-W_{MNI}$, $W_{MNQ}$ to obtain separate weighted IF signals, and after the multiplication by a weight coefficient $W_{11I}$, $W_{1NQ}-W_{1NI}$; $W_{1NQ}$, $W_{M1I}$, $W_{M1Q}-W_{MNI}$, $W_{MNQ}$ the weight IF data signals are phase matched.

Next will be a more detailed explanation of how the weight coefficients are applied to the IF signals. As seen at the top of FIG. 4, the weight coefficients $W_{11I}$, $W_{11Q}-W_{1NI}$; $W_{1NQ}$ are multiplied to the IF signal pairs for each modem Mdm 1–Mdm N of the wireless network. More specifically, each of the three subscripts $_{11I, 11Q, 1NI, 1NQ}$ of weight coefficient W represent, from left to right, the antenna element, the modem source and the real or imaginary component of the weight coefficient. Accordingly, the top portion of FIG. 4, illustrates the data processing performed for one element of the antenna array 27 for data signals received across a number of modems Mdm 1–Mdm N for transmission on a single data channel Ch 1 to a particular remote unit 14. Therefore, for each antenna element 27 in the wireless system, the beamformer unit 7 will process data across a number of modems Mdm 1–Mdm N using distinct weight coefficient vectors for transmission over respective channels Ch 1–ChM.

Accordingly, it is contemplated by the invention that the beamformer unit 7 performs digital signal processing of IF signals for several channels Ch1–ChM simultaneously. As mentioned previously, the programmable processor 25 in the processor module 16 is used for loading and modifying weight coefficients vectors $W_{11I}$, $W_{1NQ}-W_{1NI}$; $W_{1NQ}$; $W_{M1I}$, $W_{M1Q}-W_{MNI}$, $W_{MNQ}$ in real-time for the multiple data channels Ch1–ChM. The programmable processor 25 in the beamformer unit 7 also enables the weight coefficients $W_{11I}$, $W_{1NQ}-W_{1NI}$; $W_{1NQ}$; $W_{M1I}$, $W_{M1Q}-W_{MNI}$, $W_{MNQ}$ to be easily modified to adjust for changes in data traffic on the wireless network 40. The weight coefficients vectors $W_{11I}$, $W_{1NQ}-W_{1NI}$; $W_{1NQ}$; $W_{M1I}$, $W_{M1Q}-W_{MNI}$, $W_{MNQ}$ are distinct for each antenna element because they relate to the position of an antenna element, the direction of the data transmission, beam width or desired azimuthal coverage, and the like for efficient data transmission to a desired remote unit 14.

The bottom portion of FIG. 4, shows the same beamforming operation in the IF domain described above, but performed for the Mth data channel. More specifically, the weighted coefficient W for the Mth channel uses three similar subscripts $_{M1I, MNI, M1Q, MNQ}$ that represent, from left to right, the Mth antenna element, modem sources outputs from the modems Mdm 1–Mdm N, and the real and imaginary components of the weight coefficient for the Mth channel.

Figure 5:
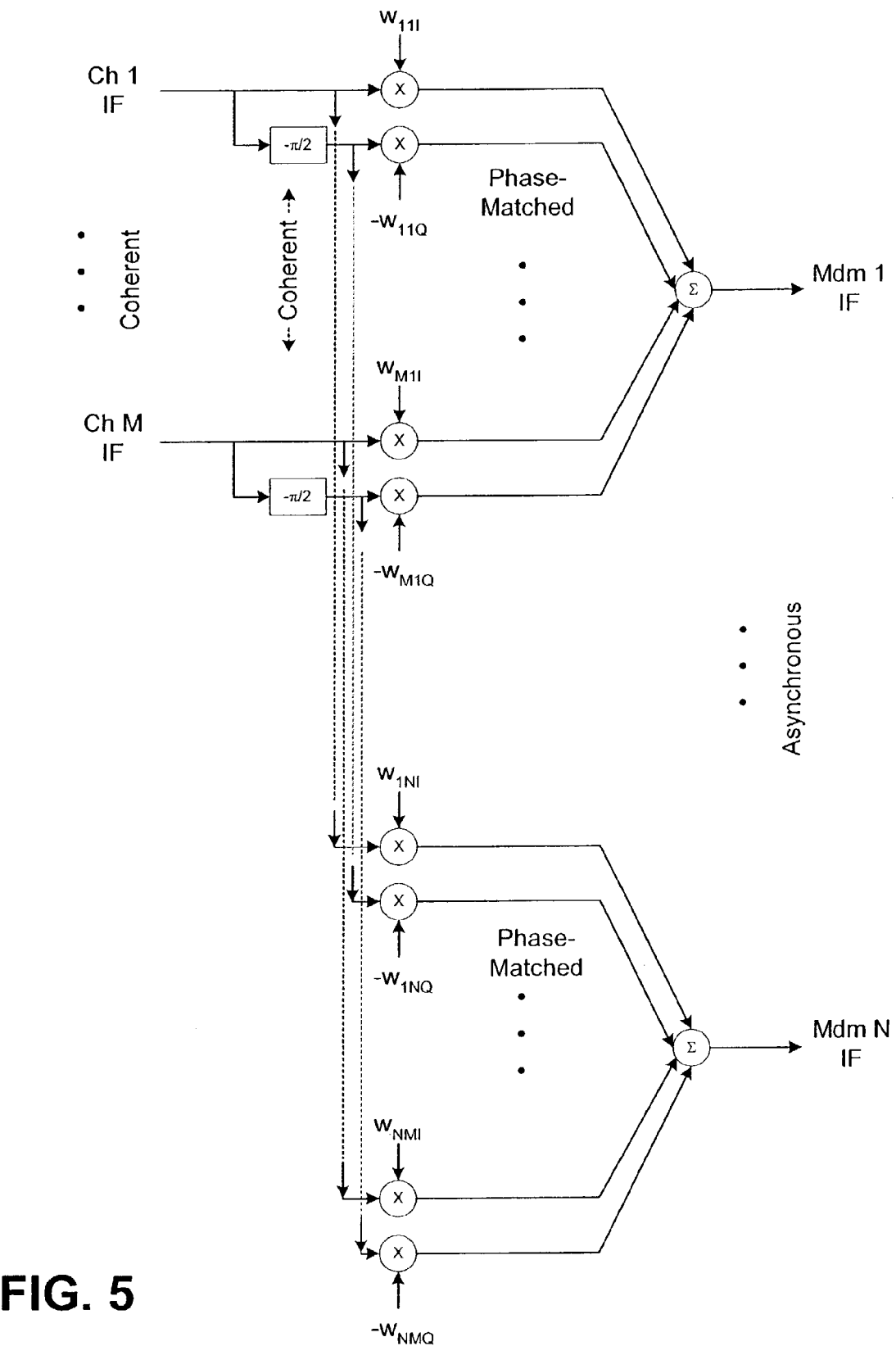
FIG. 5 is a schematic representation of beamforming in the uplink direction of a wireless network in accordance with an embodiment of the present invention.

FIG. 5 illustrates a higher form of data processing performed by the beamformer unit 7 for the uplink direction of the wireless network 40 of FIG. 1. The digital signal processing performed by the digital beamforming unit 7 in FIG. 5 is nearly identical to the digital beamforming performed in FIG. 4. FIG. 5 differs from FIG. 4 only in that it illustrates beamforming in the reverse direction or opposite direction of FIG. 4. Looking at FIG. 5, from left to right, the input signals of the beamforming unit 7 are received from the remote units 14 via the channels Ch 1–Ch M. In other words, the remote units 14 or CPEs are transmitting RF signals to the beamforming unit 7, which are received by an antenna element 27 of a tranceivers 11. The data signals are converted from RF to IF by a converter (not shown) in the transceivers 11 and inputted to the beamforming unit 7 for reverse data processing (uplink). Once received by the beamforming unit 7, the data processing is identical to that described in FIG. 4. After processing by the beamforming unit 7, each data signal is provided as an input to respective modems Mdm 1–Mdm N. From the modems Mdm 1–Mdm N, the data can be sent over the high data rate connection 2 to the data network 1.

Another minor distinction between the data processing in FIG. 4 (downlink) and the data processing in FIG. 5 (uplink) is that the weight coefficient vectors $W_{11I}$, $W_{1NQ}-W_{1NI}$; $W_{1NQ}$; $W_{M1I}$, $W_{M1Q}-W_{MNI}$, $W_{MNQ}$ used for the quadrature or imaginary components in FIG. 5 carry a negative sign. It is well known in the art that a negative weight coefficient is necessary for achieving uplink beamforming operations. One other distinction between the data processing in FIG. 4 and the data processing in FIG. 5 is that the initial data signals input from the antenna elements 27 in FIG. 5 are coherent, wherein the input data signals in FIG. 4 are asynchronous. However, after the final summing operation in FIG. 5, the data signals are again asynchronous. Thus, the relationships between the data signal in FIG. 4 are directly opposite of those in FIG. 5.

Figure 6:
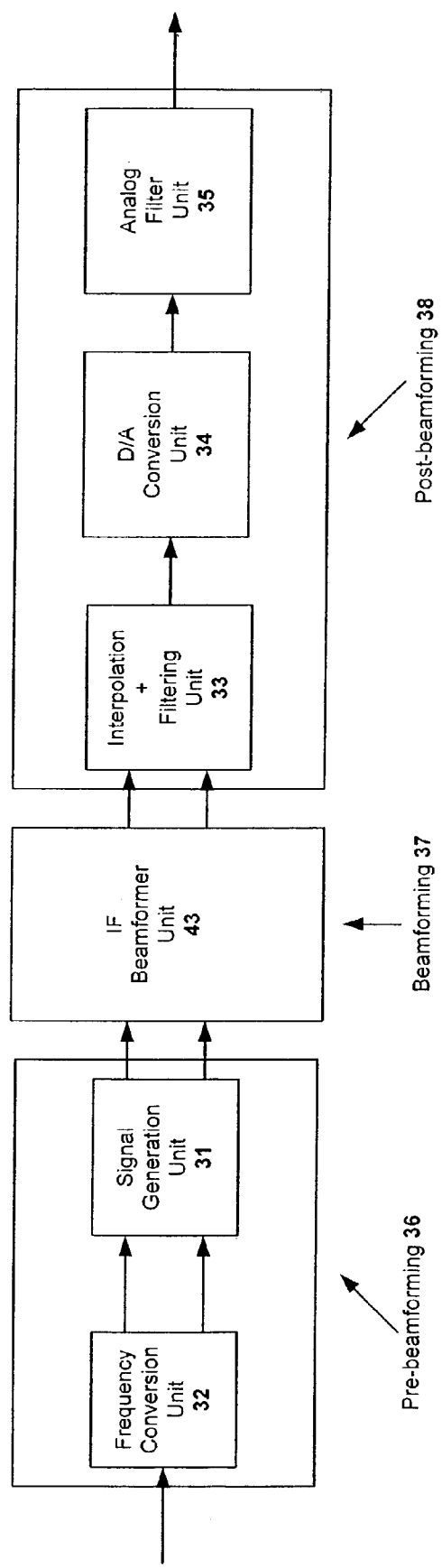
FIG. 6 is a simplified block diagram illustrating three stages of digital beamforming in accordance with an embodiment of the present invention.

FIG. 6 illustrates a simplified diagram illustrating a three step process for IF beamforming by the digital beamforming unit 7 in accordance with an embodiment of the present invention. In pre-beamforming process 36, the input IF signal can be either analog or digital. If it is analog, the IF input is first digitized at a proper sampling rate to carry out the rest of the processing in the digital domain. In the frequency conversion unit 32, the digital IF signal is either down-converted or up-converted by a quarter of the sampling rate depending on the location of the carrier frequency. The converted signal is then used to generate in-phase and quadrature components using the signal generator unit 31. The IF signal pair are passed to the beamforming unit 7 for IF digital signal processing. Due to every other sample being zero in each of in-phase and quadrature streams, and zeros occurring at different instances between the two sampling streams, the two sample streams are multiplexed to share a single signal path. This effectively reduces the computational load by half.

In the IF beamformer unit 43, beamforming calculation is done through fundamental building blocks utilizing inexpensive off-the-shelf multiply-and-add ASIC chips. This is an efficient way of realizing a matrix multiplication of the beamforming process 37, particularly with the interleaved I- and Q-form of the input signal. If M denote the number of array antenna elements, and N the number of available headend modems assigned to a single transmit RE frequency, the M.times.N would represent the complex matrix multiplication for downlink processing and N.times.M for uplink. A 4.times.2 or 2.times.4 matrix multiplier can be used as a building block to service two headend modems with four array elements for downlink and uplink, respectively.

In the post-beamforming process 38, the output of the beamforming unit 43 is first interpolated and then passed to a poly-phase filter using the interpolation and filtering unit 33, which is another application of an ASIC chip, with an interpolation ratio greater than or equal to two. The filter can be configured to be either low-pass or high-pass, depending on the location of the IF carrier frequency. After the digital-to-analog (D/A) conversion by the D/A conversion unit 34, the signal is band-pass filtered in the analog domain to remove spurious images by the analog filtering unit 35. The post-processing also reduces the sin(x)/x degradation, which is a well-known byproduct of any D/A conversion.

It is contemplated by the invention that the IF digital beamforming technique discussed above can be used to correct spectral inversion. Spectral inversion in baseband can result when performing conversions in analog processing. By way of example, a standard baseband signal is represented using the following expression:

$$z(t) = x(t) + jy(t),$$

the up-converted If (or RF) signal can be expressed in the analytic signal format using standard quadrature multiplexing expressed as follows:

$$s(t) = z(t)e^{j\omega t}$$
$$= [x(t)\cos\omega t - y(t)\sin\omega t + j[x(t)\sin\omega t + y(t)\cos\omega t]$$

[Only the real part of s(t), without its Hilbert transform in the imaginary part, is processed throughout analog devices.] The spectrally inverted version looks like the following expression:

$$\tilde{s}(t) = \overline{z(t)}e^{j\omega t}$$
$$= [x(t)\cos\omega t + y(t)\sin\omega t] + j[x(t)\sin\omega t - y(t)\cos\omega t]$$

Thus, the relationship between the two is as follows:

$$s(t) = \overline{\tilde{s}(t)e^{-j\omega t}}e^{j\omega t}$$
$$= \overline{\tilde{s}(t)}e^{j2\omega t}$$

Using a matrix notation with real quantities only, this can be written as follows:

$$\begin{pmatrix} x(t)\cos\omega t - y(t)\sin\omega t \\ x(t)\sin\omega t + y(t)\cos\omega t \end{pmatrix} = \begin{bmatrix} \cos 2\omega t & 0 \\ 0 & -\cos 2\omega t \end{bmatrix} \begin{pmatrix} x(t)\cos\omega t + y(t)\sin\omega t \\ x(t)\sin\omega t - y(t)\cos\omega t \end{pmatrix}$$
$$= \begin{bmatrix} 0 & \sin 2\omega t \\ \sin 2\omega t & 0 \end{bmatrix} \begin{pmatrix} x(t)\cos\omega t + y(t)\sin\omega t \\ x(t)\sin\omega t - y(t)\cos\omega t \end{pmatrix}$$

assuming the standard low-pass filtering. This property can be exploited to reverse the inverted spectrum. Another equality in the real domain is:

$$\begin{pmatrix} x(t)\cos(-\omega t) + y(t)\sin(-\omega t) \\ x(t)\sin(-\omega t) - y(t)\cos(-\omega t) \end{pmatrix} = \begin{pmatrix} x(t)\cos\omega t - y(t)\sin\omega t \\ -\{x(t)\sin\omega t + y(t)\cos\omega t\} \end{pmatrix}$$

In other words, the inverted signal with its frequency negated becomes the complex conjugate of the normal (non-inverted) signal. For example, the halfband filter HSP43216 can be used in the spectrally reversed mode and adjust the sign of the imaginary part accordingly in the subsequent processing; e.g. multiply by (+v) instead of (−v).

I claim:

1. An apparatus for digital beamforming in the intermediate frequency (IF) domain, comprising: an input unit adapted to receive a plurality of IF input signals from a plurality of input sources; a separator/generator adapted to separate each of said plurality of IF input signals into a plurality of IF signal pairs and to generate an in-phase and quadrature signal for each of said plurality of IF signal pairs; a shifter unit adapted to shift each of said IF signals in phase and amplitude; a multiplier unit adapted to multiply each in-phase and quadrature signal with a predetermined weight coefficient vector; a summer unit adapted to sum the weighted in-phase and quadrature signals to produce a plurality of IF output signals; and a controller for the general control and monitoring of said units of the apparatus, wherein each of said output signals is associated with a data channel and an element of an antenna array.

2. The apparatus of claim 1, wherein said multiplier unit multiplies each in-phase and quadrature signal by a different weight coefficient vector.

3. The apparatus of claim 2, wherein said plurality of input IF signals are asynchronous or coherent.

4. The apparatus of claim 3, wherein said controller further comprises at least one processing module that can be configured according to the number IF input signals and channels being used by said apparatus.

5. The apparatus in claim 4, wherein said processing module includes at least one programmable processor.

6. The apparatus of claim 5, wherein said programmable processor implements in software each of said weight coefficients.

7. The apparatus of claim 6, wherein said programmable processor modifies said weight coefficients in real-time.

8. The apparatus of claim 7, wherein said programmable processor modifies said weight coefficients to correct the effects of spectral inversion.

9. The apparatus of claim 8, wherein the apparatus performs digital beamforming in the IF domain on said IF input signals in the uplink or downlink direction.

10. The apparatus of claim 9, wherein said multiplier unit produces said weighted IF output signals so as to have the same carrier frequency as said IF input signals.

11. The apparatus of claim 10, wherein said shifter unit shifts each of the IF signals in amplitude and phase by 90-degrees.

12. The apparatus of claim 11, wherein said separator unit/generator unit, shifter unit, multiplier unit and summer unit are implemented in software in said apparatus.

13. The apparatus of claim 1, and further comprising a plurality of transmitter devices that collectively transmit the IF output signals to a remote unit.

14. The apparatus of claim 13, wherein said controller performs automated calibration to compensated for differences in phase and amplitude among said plurality of wireless data channels.

15. The apparatus of claim 13, wherein the plurality of transmitters are radio frequency transmitters.

16. A system for digital beamforming in the intermediate frequency (IF) domain, comprising:
   a network connection for communicating data between a data network and said system;
   a router for routing data received from said network connection to said system;
   a plurality of modems for receiving a plurality of IF signals from said router;

a digital beamformer unit for performing beamforming digital signal processing of said plurality of IF signals received by modems to produce a plurality of IF output signals;

a plurality of antenna elements;

a plurality of transceivers each associated with a corresponding one of the plurality of antenna elements for upconverting a corresponding one of the plurality of IF output signals for wireless transmission to a plurality of remote units via said plurality of antenna elements.

17. The system of claim 16, wherein said digital beamfomer unit performs said digital signal processing of said IF signals in the downlink direction of a wireless network.

18. A system for digital beamforming in the intermediate frequency (IF) domain, comprising:

a plurality of transceivers having antenna elements for wirelessly receiving a plurality of signals transmitted from corresponding ones of a plurality of remote units and producing a corresponding plurality of IF signals;

a digital beamformer unit for performing beamforming digital signal processing of said plurality of IF signals to produce a plurality of IF output signals;

a plurality of modems connected to said digital beamformer unit each for receiving a corresponding one of said IF output signals; and a router connected to said plurality of modems for transmission of said IF output signals to a data network.

19. The system as in either claim 16 or 18, wherein said network connection is a high data rate fiber optic or OC3 connection.

20. The system of claim 19, wherein said router is capable of routing a high rate of data between said system and said data network via the network connection.

21. The system of claim 20, wherein said digital beamformer unit includes a separating/generating unit, shifting unit, multiplier unit and summing unit; wherein said separating/generating unit separates each of the plurality of IF signals into a plurality of IF signal pairs and generates an in-phase and quadrature signal for each of said IF signal pairs, said shifting unit shifts each one of said IF signals in amplitude and phase, said multiplier unit multiplies each in-phase and quadrature signal with a predetermined weight coefficient, and said summing unit sums the weighted in-phase and quadrature signals to produce said plurality of IF output signals.

22. The system of claim 21, further comprising a controller for performing general control and monitoring of said units within said digital beamformer unit.

23. The system of claim 22, wherein said multiplier multiplies each in-phase and quadrature signal by a different weight coefficient.

24. The system of claim 23, wherein said controller further comprises at least one processing module that is configurable according to the number said of plurality of IF signals being used by said system.

25. The system of claim 22, wherein said controller performs automated calibration to compensate for differences in phase and amplitude among said plurality of transceivers.

26. The system of claim 25, wherein said processing module includes at least one programmable processor.

27. The apparatus of claim 26, wherein said programmable processor implements in software each of said weight coefficients.

28. The system of claim 27, wherein said programmable processor modifies said weight coefficients in real-time.

29. The system of claim 28, wherein said programmable processor modifies said weight coefficients to correct the effects of spectral inversion.

30. The system of claim 29, wherein said IF output signals have the same carrier frequency as said IF data signals.

31. The system of claim 30, wherein said shifter unit shifts each of the IF signals in amplitude and phase by 90-degrees.

32. The system of claim 31, wherein said separator unit, shifter unit, generator unit, multiplier unit and summer unit are implemented in software in said digital beamformer unit.

33. The system of claim 18, wherein said digital beamformer unit performs said digital signal processing of said IF signals in the uplink direction of a wireless network.

34. A method for digital beamforming in the IF domain, comprising: receiving at a beamformer unit a plurality of IF input signals from a plurality of input sources; separating each of said plurality of IF input signals into a plurality of IF signal pairs in said beamformer unit; generating an in-phase and quadrature signal for each of said plurality of IF input signals in said beamformer unit; shifting each one of said IF input signals in both amplitude and phase in said beamformer unit; multiplying each in-phase and quadrature signal for said plurality of IF input signals with a predetermined weight coefficient vector in said beamformer unit; and summing the weighted in-phase and quadrature signals for said plurality of IF input signals to produce a plurality of IF output signals in said beamformer unit; wherein each of said output signals is associated with a data channel and an element of an antenna array.

35. The method of claim 34, wherein said multiplying comprises multiplying each in-phase and quadrature signal by a different weight coefficient vector.

36. The method of claim 35, further comprising configuring said beamformer unit according to the number of input sources and data channels using a processing module within a controller of said beamformer unit.

37. The method of claim 36, further comprising implementing in software each of said weight coefficient vectors using a programmable processor in processing module.

38. The method of claim 37, further comprising modifying each said weight coefficient vector in real-time using said programmable processor.

39. The method of claim 38, wherein said modifying comprises modifying said weight coefficient vector to correct the effects of spectral inversion.

40. The method of claim 39, wherein said digital beamforming in the IF domain is performed in the uplink or downlink direction of a wireless network.

41. The method of claim 40, wherein said shifting comprises shifting each of the IF signals in amplitude and phase by 90-degrees.

42. The method of claim 41, wherein said separator, generator, shifter, multiplier and summer are implemented in software in said beamformer unit.

43. A computer-readable medium encoded with processing instructions, that when executed by a computer or processor, cause the computer or processor to process signals for implementing digital beamforming in the intermediate frequency (IF) domain, comprising functions of: receiving a plurality of IF input signals from a plurality of input sources; separating each of said input signals into a plurality of IF signal pairs; generating an in-phase and quadrature signal for each of said IF signal pairs; shifting each of said IF input signals in amplitude and phase; multiplying each in-phase and quadrature signal for said IF input signals with a predetermined weight coefficient vector; and summing the weighted in-phase and quadrature signals for said IF input signals to produce a plurality of IF output signals, wherein each of said output signals is associated with a data channel and an element of an antenna array.

44. The computer-readable medium of claim 43, wherein said processing instructions encoded on the computer-readable medium for multiplying comprise instructions for multiplying each in-phase and quadrature signal for said IF input signals by a different weight coefficient vector.

45. The computer-readable medium of claim 44, and further comprising processing instructions encoded on the computer-readable medium for configuring processing of signals according to the number IF input sources and data channels.

46. The computer-readable medium of claim 45, and further comprising processing instructions encoded on the computer-readable medium for loading and modifying each of said weight coefficient vectors in real-time.

47. The computer-readable medium of claim 46, and further comprising processing instructions encoded on the computer-readable medium for modifying at least one weight coefficient vector to correct the effects of spectral inversion.

48. The computer-readable medium of claim 43, and further comprising processing instructions encoded on the computer-readable medium for performing digital beamforming in the IF domain in the uplink or downlink directions of a wireless network.

49. The computer-readable medium of claim 48, and further comprising processing instructions encoded on the computer-readable medium for shifting each of the IF signals in amplitude and phase by 90-degrees.

50. A method for digital beamforming in the IF domain, comprising: receiving N plurality of IF input signals from a plurality of modems, each of the N plurality of IF input signals to be transmitted to a corresponding one or more of a plurality of remote terminals via M plurality of antenna elements; generating an in-phase (I) and a quadrature (Q) IF transmit signal for each of said N plurality of IF input signals; for each antenna element i=1 to M, multiplying the I and Q IF transmit signals for each of said N plurality of IF input signals by corresponding weight coefficients $W_{ijI}$, $W_{ijQ}$ for j=1 to N. to produce N plurality of weighted I and Q IF transmit signals for each of said M plurality of antenna elements; and summing together the N weighted I and Q IF transmit signals for each of said M plurality of antenna to produce M plurality of IF output signals, each of the plurality of IF output signals for upconversion and transmission via a corresponding one of the M plurality of antenna elements.

51. The method of claim 50, and further comprising: producing M plurality of IF receive signals derived from a signal transmitted from any one or more of the plurality of remote terminals and received at the M plurality of antenna elements; generating I and Q IF receive signals for each of said M plurality of IF receive signals; multiplying the I and Q IF receive signals for each of said M plurality of IF receive signals by corresponding weight coefficients $W_{ijI}$,$-W_{ijQ}$ for i=1 to M to produce M plurality of weighted I and Q IF receive signals; and summing together the M weighted I and Q IF receive signals to produce IF receive signals for each of a corresponding one or more of the N plurality of modems.

52. The method of claim 50, and further comprising modifying said weight coefficients $W_{ijI}$, $W_{ijQ}$ for i=1 to M and j=1 to N, in real-time as needed.

53. The method of claim 52, wherein modifying comprises modifying said weight coefficients to correct for effects of spectral inversion.

54. The method of claim 50, wherein the weight coefficients $W_{ijI}$, $W_{ijQ}$ for i=1 to M and j=1 to N are distinct and relate to a position of each of the M antenna elements and a direction of a transmission, and a beam width or desired azimuthal coverage.

55. A method for digital beamforming in the IF domain, comprising: producing M plurality of IF receive signals derived from a signal transmitted from any one or more of a plurality of remote terminals and received at M plurality of antenna elements; generating in-phase (I) and quadrature (Q) IF receive signals for each of said M plurality of IF receive signals; multiplying the I and Q IF receive signals for each of said M plurality of IF receive signals by corresponding weight coefficients $W_{ijI}$,$-W_{ijQ}$ for i=1 to M to produce M plurality of weighted I and Q IF receive signals; and summing together the M weighted I and Q IF receive signals to produce IF receive signals for each of a corresponding one or more of the N plurality of modems.

56. The method of claim 55, and further comprising: receiving N plurality of IF input signals from the plurality of modems, each of the N plurality of IF input signals to be transmitted to a corresponding one or more of the plurality of remote terminals via M plurality of antenna elements; generating I and Q IF transmit signals for each of said N plurality of IF input signals; for each antenna element i=1 to M, multiplying the I and Q IF transmit signals for each of said N plurality of IF input signals by corresponding weight coefficients $W_{ijI}$, $W_{ijQ}$ for j=1 to N to produce N plurality of weighted I and Q IF transmit signals for each of said M plurality of antenna elements; and summing together the N weighted I and Q IF transmit signals for each of said M plurality of antenna to produce M plurality of IF output signals, each of the plurality of IF output signals for upconversion and transmission by a corresponding one of the M plurality of antenna elements.

57. A computer-readable medium encoded with instructions, that when executed by a computer or processor, cause the computer or processor to process N plurality of intermediate frequency (IF) input signals from a plurality of modems, each of the N plurality of IF input signals to be beamformed and transmitted to a corresponding one of a remote terminals via M plurality of antenna elements, and to process M plurality of IF receive signals derived from a signal transmitted from any one or more of the plurality of remote terminals and received at the M plurality of antenna elements, wherein the instructions cause the computer or processor to perform functions of:

in a transmit direction, generating an in-phase (I) and a quadrature (Q) IF transmit signal for each of said N plurality of IF input signals; for each antenna element i=1 to M, multiplying the I and Q IF transmit signals for each of said N plurality of IF input signals by corresponding weight coefficients $W_{ijI}$, $W_{ijQ}$ for j=1 to N to produce N plurality of weighted I and Q IF transmit signals for each of said M plurality of antenna elements; and summing together the N weighted I and Q IF transmit signals for each of said M plurality of antenna to produce M plurality of IF output signals, each of the plurality of IF output signals for upconversion and transmission via a corresponding one of the M plurality of antenna elements; and in a receive direction, generating I and Q IF receive signals for each of said M plurality of IF receive signals; multiplying the I and Q IF receive signals for each of said M plurality of IF receive signals by corresponding weight coefficients $W_{ijI}$, $W_{ijQ}$ for i=1 to M to produce M plurality of weighted I and Q IF receive signals; and summing together the M weighted I and Q IF receive signals to produce IF receive signals for each of a corresponding one more of the N plurality of modems.

58. The computer-readable medium of claim 57, and further comprising instructions encoded on the medium for modifying said weight coefficients $W_{ijI}$, $W_{ijQ}$ for i=1 to M and j=1 to N, in real-time as needed.

59. The computer-readable medium of claim 58, wherein said instructions for modifying comprises instructions for modifying said weight coefficients to correct for effects of spectral inversion.

60. The computer-readable medium of claim 57, wherein and further comprising instructions for generating said weight coefficients $W_{ijI}$, $W_{ijQ}$ for i=1 to M and j=1 to N, that are distinct and relate to a position of each of the M antenna elements and a direction of a transmission, and a beam width or desired azimuthal coverage.

* * * * *